United States Patent [19]

Meyer

[11] Patent Number: 5,039,341

[45] Date of Patent: Aug. 13, 1991

[54] BINDER COMPOSITION COMPRISES A BLEND OF A HIGH VISCOSITY AND LOW VISCOSITY HYDROXYPROPYL METHYLCELLULOSE ETHER, AND A TAPE JOINT COMPOSITION CONTAINING SUCH BINDER

[75] Inventor: Wilfred C. Meyer, Midland, Mich.

[73] Assignee: The Dow Chemical Company, Midland, Mich.

[21] Appl. No.: 435,109

[22] Filed: Nov. 13, 1989

Related U.S. Application Data

[63] Continuation-in-part of Ser. No. 285,995, Dec. 19, 1988, abandoned.

[51] Int. Cl.$^5$ .................. C09D 101/28; C09K 3/10
[52] U.S. Cl. .................. 106/197.1; 106/189
[58] Field of Search .................. 106/192.1, 197.2, 189; 524/43, 45, 55

[56] References Cited

U.S. PATENT DOCUMENTS 2,631,082  3/1953  Noyes .................. 106/197.2
3,014,808 12/1961  Nyberg .................. 106/176
4,373,959  2/1983  Socha .................. 106/197.1
4,594,108  6/1986  Greminger et al. .................. 106/197.1
4,614,545  9/1986  Hess .................. 106/197.1

Primary Examiner—Brian E. Hearn
Assistant Examiner—David M. Brunsman

[57] ABSTRACT

A cellulose ether blend useful as an adhesive in finishing compounds, comprising a high viscosity hydroxypropyl methylcellulose having a viscosity from about 4,000 to about 120,000 cps and a low viscosity hydroxypropyl methylcellulose having a viscosity from about 5 to about 3,000 cps, wherein the hydroxypropyl methylcellulose blend is at least from about 10:1 to about 1:2 high viscosity hydroxypropyl methylcellulose to low viscosity hydroxypropyl methylcellulose. Both the high and low viscosity cellulose ethers have a methoxyl substitution of about 25 to about 32 weight percent and a hydroxypropyl substitution of about 3 to about about 13 weight percent. The cellulosic blend can be used in tape joint compounds, tile adhesives, grouts, spray textures and stucco compositions.

12 Claims, No Drawings

BINDER COMPOSITION COMPRISES A BLEND OF A HIGH VISCOSITY AND LOW VISCOSITY HYDROXYPROPYL METHYLCELLULOSE ETHER, AND A TAPE JOINT COMPOSITION CONTAINING SUCH BINDER

CROSS-REFERENCE TO RELATED APPLICATION

This is a continuation in part, of application Ser. No. 285,995, filed Dec. 19, 1988 now abandoned.

BACKGROUND OF THE INVENTION

Gypsum wallboard is used to construct walls and ceilings by fixing the panels to studs and filling the joints where sections are butted together with a combination of tape joint compound and perforated tape. Tape joint adhesive compositions are in two forms—powdered tape joint compounds and ready mix tape joint cement compositions. Powdered tape joint compounds are added to water and the mixture is stirred until a workable consistency is attained: whereas, ready mix compositions need only stirring before use.

In the construction industry, the ready mix tape joint cement composition is preferred for obvious convenience reasons, although both forms are used. A typical ready mix or powdered composition comprises filler components, thickeners, binders, and minor amounts of defoamer, preservative, dispersant and a processing aid to improve water-retention properties. Traditional binders include vinyl latexes of polyvinyl acetate, ethylene vinyl acetate copolymers, polyvinyl alcohol, various starches, guar gum and derivatives, casein and the like. See Elden, U.S. Pat. No. 3,303,147; Mills et al., U.S. Pat. No. 3,483,156; Wilkenson, U.S. Pat. No. 3,342,761. Binders such as polyacrylamides have also been used (Bruschtein, U.S. Pat. No. 3,793,269).

Typically, cellulose ethers are used as thickeners in adhesive compositions, more particularly in tape joint compositions. When combined with latex binders some cellulose ethers hinder bond strength properties, while others increase bond strength properties. Although in some instances cellulose ethers when combined with latex binders can increase bond strengths, this occurs when there is a large amount of the latex binder present. There are problems with using a latex binder in the adhesive compositions. The latex binders are very expensive. It has not been possible to replace the latex binder or reduce the amount used with a cellulosic thickener, such that adequate bond properties are induced in the material without excessive viscosity build-up. Obviously, it would be desirable to have a composition which has little or no latex binder present, but yet still retain good bonding and rheology properties.

In addition to the construction industry preferring the convenience of the ready mix composition, other properties such as superior thickening action, workability, open-time or water retention, crack resistance on drying, and lubricity in slip action during application are important. It would be highly desirable to have a blend of cellulose ethers that is useful in ready mix tape joint compositions, powdered tape joint compositions and other adhesive compositions. These compositions should have the properties that are desired by the construction industry, most importantly good binding properties and little or no latex binder.

SUMMARY OF THE INVENTION

This invention is a cellulose ether blend useful as a binder in adhesive compositions. The blend comprises high viscosity hydroxypropyl methylcellulose having a viscosity from about 4,000 to about 120,000 cps and a low viscosity hydroxypropyl methylcellulose having a viscosity from about 5 to about 3,000 cps, each as a 2 percent solution. The hydroxypropyl methylcellulose blend is at least from about 10:1 to about 1:2 high viscosity hydroxypropyl methylcellulose to low viscosity hydroxypropyl methylcellulose. Each hydroxypropyl methylcellulose component has a methoxyl substitution of about 25 to about 32 weight percent and a hydroxypropyl content of about 3 to about 13 weight percent.

Generally, the cellulosic blend can be used in tape joint compounds, tile adhesives, grouts, spray textures and stucco compositions. The cellulose ether blend can be used in the construction industry and works well as either a powder blend, which contains all the ingredients except water, or it can be in the form of a ready mix composition, wherein the composition needs only stirring before use.

Compositions that contain the blend have superior rheology and workability. Additionally, lubricity in the slip action is good. The compositions also have good bonding properties, water retention and crack resistance on drying. The blend can function dually as a thickener and a binder without the presence of a latex binder and when employed in adhesive compositions, still retain the physical properties which the construction industry demands.

DETAILED DESCRIPTION OF THE INVENTION

FIELD OF INVENTION

This invention relates to adhesive compositions, wherein the composition contains a blend of cellulose ethers of different viscosity ranges that function as a binder without the presence of a latex to impart desirable properties thereto. The viscosity measurement for the hydroxypropyl methylcellulose compounds were taken with a Ubbelohde tube with standard ASTM reference method D1347 and D2363.

By latex herein it is meant to include polymerized emulsions and solid redispersible polymer emulsions.

The cellulose ether blend is useful in adhesive compositions. The blend comprises a high viscosity and low viscosity cellulose ether. The high viscosity cellulose ether is hydroxypropyl methylcellulose. The high viscosity cellulose ethers have a viscosity from about 4,000 to about 120,000 cps as a 2 percent solution, preferably from about 4,000 to about 80,000 cps. The low viscosity cellulose ether is hydroxypropyl methylcellulose. The low viscosity cellulose ether has a viscosity from about 5 to about 3,000 cps as a 2 percent solution, preferably from about 30 to about 2,000 cps: more preferably from about 30 to about 1,000 cps: most preferably from about 30 to about 500 cps as a 2 percent solution. The hydroxypropyl methylcellulose, whether high or low viscosity, has a methoxyl substitution from about 25 to about 32 weight percent and the hydroxypropyl substitution is about 3 to about 13 weight percent; preferably, from about 27 to about 30 weight percent methoxyl substitution and from about 4 to about 7.5 weight percent hydroxypropyl substitution.

The high and low substituted cellulose ethers are blended in various ratios to impart the desired properties, e.g. bonding, adhesion, thickening action, water retention and the like. As one increases the amount of high viscosity cellulose ether used, the composition has greater water demand, a better crack rating, a heavier texture and short flow characteristics. As one increases the amount of low viscosity cellulose ether used, the stickiness is increased, the composition has somewhat longer flow properties when sheared and has greater thixotropy.

Depending upon the desirability of the above mentioned properties, the high and low viscosity cellulose ethers are blended at least from about 10:1 to about 1:2 high to low viscosity cellulose ether, preferably the cellulose ethers are blended in a high to low ratio of about 8:1 to about 1:2, most preferably the cellulose ethers are blended in a high to low ratio ratio of about 5:1 to about 2:1.

This blend composition functions as an adhesive which can be used in tape joint compounds, tile adhesives, grouts, spray textures and stucco compositions. The cellulosic blend can completely replace a latex binder. Complete or even substantial removal of the latex binder was not possible until the development of the present invention. Optionally, the latex could be added in reduced amounts if desired, about 1.5 weight percent or less based on solids. Most commonly this blend is used as a tape joint adhesive composition and can function well in either the powdered or ready mix form. The adhesive composition containing the blend spreads easily or has lubricity in the slip action, has good adhesion properties, good crack resistance, and superior thickening action.

When using the blend in tape joint compositions, the composition typically contains calcium carbonate, mica or optionally talc or both, clay, ethylene glycol or propylene glycol, defoamer, water, the high to low viscosity cellulosic blend and a preservative, optionally if the composition is a ready mix. Generally, the blend is admixed dry with the other ingredients and then mixed with a water mixture containing the defoamer, ethylene glycol and the preservative. Alternatively, the high and low viscosity cellulose ethers could be admixed with the other ingredients without the cellulose ethers being preblended first.

The tape joint composition usually contains about 40 to about 95 weight percent limestone, about 2 to about 10 weight percent mica, about 1 to about 10 weight percent clay, about 1 to about 3 weight percent ethylene glycol, about 0.1 to about 0.5 weight percent defoamer, about 20 to about 35 weight percent water and about 0.3 to about 1.0 cellulosic blend, based on total weight.

When using the blend in a stucco composition, the composition typically contains from about 50 to about 80 weight percent Portland Cement, from about 20 to about 50 weight percent sand or other filler, and from about 0.2 to about 0.5 weight percent cellulosic blend based on cement. Optionally, surfactants may be added to improve rheology characteristics.

When using the blend in a tile adhesive composition, the composition typically contains from about 2 to about 97 weight percent Portland Cement, from about 0 to about 75 weight percent filler and from about 0.2 to about 2 weight percent cellulosic blend based on solids. The inert filler is optional, but if desired can include sand limestone, silica, or most any other inert particulate inorganic material.

When using the blend in a spray texture composition, the composition typically contains about 1 to about 3 weight percent wetting agent, about 3 to about 7 weight percent vermiculite, about 1 to about 3 weight percent titanium oxide, about 2 to about 5 weight percent clay, about 5 to about 10 weight percent mica, about 50 to about 80 weight percent calcium carbonate and about 0.3 to about 0.7 weight percent cellulosic blend based on solids hydroxypropyl methylcellulose.

EXAMPLE 1

A tape joint compound using the composition prescribed in Table I is prepared by first blending the dry ingredients of calcium carbonate, mica, attapulgite clay and the high and low viscosity cellulose ethers in a tumbler, charging the blended dry ingredients in a mixing apparatus and adding a water mixture comprising: water, preservative, defoamer, and ethylene glycol. After the addition of the water mix, the tape joint composition is mixed for about 10 minutes, occasionally stopping the mix to scrape down the sides of the bowl. The composition is mixed until a homogeneous mixture is obtained. The cement is placed in a container and stored for 24 hours or more before use.

The cellulose ether blend in Example 1, Table 1, comprises: hydroxypropyl methylcellulose (HPMC) with a viscosity content of 40,000 cps as a 2 percent solution and another HPMC with a viscosity of 50 cps as a 2 percent solution. No latex binder is present. The blend contains a high viscosity HPMC that has a methoxyl content of 28 weight percent and a hydroxypropyl content of 6 weight percent and the low viscosity HPMC has a methoxyl content of 29 weight percent and a hydroxypropoxyl content of 6.5 weight percent.

A control sample of the composition in this example as prescribed in Table I is similarly prepared except that a latex binder is added to the composition and only one cellulose ether is used, the high viscosity cellulose ether. The cellulose ether is HPMC, having a viscosity of 40,000 cps as a 2 percent solution with a methoxyl content of about 28 weight percent and a hydroxypropyl content of about 6 weight percent.

TABLE I*

| Ingredient | Example 1, Tape Joint Composition Without Latex (percent) | Tape Joint Composition With Latex Control (percent) |
| --- | --- | --- |
| Calcium carbonate | 89.14 | 86.93 |
| Mica | 6.08 | 5.93 |
| Attapulgite clay | 3.04 | 2.97 |
| Hydroxypropyl methylcellulose, surface treated (40,000 cps 2 percent solution) | 0.42 | 0.59 |
| Hydroxypropyl methylcellulose, 50 cps | 0.68 | 0 |
| Ethylene glycol | 0.51 | 0.49 |
| Preservative | 0.10 | 0.10 |
| Defoamer | 0.03 | 0.03 |
| Latex binder | — | 2.96 |
| Water, by Weight of Total Composition | 31.7 | 31.3 |

*The data in Table I is based on percent by weight of ingredients minus water.

The hydroxypropyl methylcellulose blend comprises a ratio of about 1 to 1.5, high viscosity cellulose ether to low viscosity cellulose ether.

To characterize the tape joint compounds, the following tests were conducted:

Viscosity: Measured in Brabender units, desirably in the range of 500-550 units, determined on a VC-3E Brabender at about 19° C. and equipped with a 250 centimeter-gram torsion head, the viscometer operated at 75 rpm spindle speed.

Adhesion: A paper tape test is conducted where the percent of tape tear over a given area is evaluated. Tape joint compound is applied between gage strips placed about four inches apart on gypsum wallboard to a depth of 0.05 inches. Paper tape is imbedded in the joint compound such that a final thickness of tape and compound is 0.025 inches. The sample is placed in a 70° F., 50 percent relative humidity environment overnight. The tape is scored in an "X" fashion and the tape peeled from the joint compound. If the entire tape tears or delaminates from itself over the total area exposed, a 100 percent bond rating is given to the tape joint compound. If the tape lifts intact from the joint compound, a zero percent bond is given.

Cracking: A stainless steel ring of $\frac{1}{8}$ inch depth and inside diameter of $2\frac{3}{4}$ inches is filled with tape joint cement, placed in a 70° F., 50 percent relative humidity environment, and dried overnight. Cracking is rated as: 1=none; 2=slight, small cracks; 3=one or two large cracks or several small cracks; 4=moderate cracks with some large cracks: and 5=severe cracking, with many large cracks.

Thixotropy: The ease of spreadability of tape joint cements can be related to the loss of viscosity of the material during its application to gypsum wallboard. The calculated shear rate of application lies between 20 to 200 sec$^{-1}$ depending on the thickness of the joint cement being applied. For convenience, a shear rate of 57 sec$^{-1}$ was chosen to describe ease of application. A Haake Rotovisco RV3 viscometer using the SVII profiled cup and rotor system was used to measure viscosity loss during shearing at 57 sec$^{-1}$ for 3-7 seconds of shear. The examples had been stored for 24 hours or more and were unsheared except for placement into the sample cup. Measurements were run at 19° C. Thixotropy is reported as percent loss of peak viscosity for a standard time of shear. A greater loss of viscosity during shear is equated to a greater ease of application.

The properties of the composition in this example, in Table I, are the following:

TABLE II

| Example 1 | Brabender Viscosity | Bond (%) | Crack Tendency rating | Thixotropy percent at 57 sec$^{-1}$ |
|---|---|---|---|---|
| Control, with Latex and HPMC | 550 | 90 | 2 | 14 |
| Example 1, with Blend of high and low HPMC's, no latex | 530 | 90 | 2 | 23 |

Results—from Example 1 Tables I and II

The control tape joint composition contains a latex binder, but not the HPMC blend. The Example 1 contains the HPMC blend, but not the latex binder. The Control and Example 1 have equivalent water demand, as expressed in Table I as water content. The two compositions have similar viscosity, bonding and cracking tendencies as presented in Table II. Example 1 has improved ease of application or thixotropy, as presented in Table II. The bonding or adhesion properties of the compositions are the same, as presented in Table I, but Example 1 requires only 1.10 percent total cellulosic blend, whereas the control contains 2.96 percent latex solid and 0.59 percent HPMC to achieve the same bonding properties.

EXAMPLE 2

This example shows that the blend of hydroxypropyl methylcellulose ethers control rheological properties—expressed in Brabender units of viscosity—better than single component systems equivalent to the blend. Tape joint compositions are prepared following the procedure of Example 1 and formulation of Table I, with the hydroxypropyl methylcellulose also having the same methoxyl and hydroxypropoxyl substitution, except the total percent by weight of HPMC used was reduced to 1.02 percent (from 1.10 percent). A tape joint composition containing a latex binder is not illustrated in this example. Results are tabulated in Table III.

TABLE III

| Example 2 | Brabender | Bond (%) | Crack Rating |
|---|---|---|---|
| (A) *No latex binder, HPMC (4,000 cps) | 750 | 75 | 3 |
| (B) 1:2 ratio HPMC (40,000 cps) to HPMC (914 cps) | 660 | 80 | 2 |
| (C) *HPMC (2,000 cps) alone, no latex binder | 600 | 75 | 1 |
| (D) 1:2 ratio HPMC (40,000 cps) to HPMC (312) | 540 | 80 | 1 |

*Samples A and C are not examples of the invention. Sample A uses a HPMC that has a viscosity equal to the viscosity of the blend used in Example B, while the viscosity of the HPMC used in sample C corresponds to the viscosity of the blend used in Example D.

Results —Example 2

It is seen that the single component cellulose ethers, samples (A) and (C) give reduced bond and high Brabender viscosities. The addition of water to these samples to give correct Brabender viscosities further erodes bond properties. Example (D) yields a proper Brabender viscosity and has improved crack resistance with adequate bond properties. This example shows that proper viscosity, bond, and crack resistance can be imparted in tape joint compounds by those skilled in the art without use of latex binder with a proper choice of cellulose ether blend.

What is claimed is:

1. A tape joint composition which comprises from about 40 to about 95 weight percent limestone, from about 2 to about 10 weight percent mica, from about 1 to about 10 weight percent clay, from about 1 to about 3 weight percent ethylene glycol, from about 0.1 to about 0.5 weight percent defoamer, from about 20 to about 35 weight percent water and from about 0.3 to about 1.0 cellulosic blend, wherein the blend contains a high viscosity hydroxypropyl methylcellulose having a viscosity from about 4,000 to about 120,000 cps and a low viscosity hydroxypropyl methylcellulose having a viscosity from about 5 to about 3,000 cps, and the hydroxypropyl methylcellulose blend is at least from about 10:1 to about 1:2 high viscosity hydroxypropyl methylcellulose to low viscosity hydroxypropyl methylcellulose.

2. The tape joint composition in claim 1, wherein the high viscosity hydroxypropyl methylcellulose has a viscosity from about 4,000 to about 80,000 cps and low viscosity hydroxypropyl methylcellulose has a viscosity from about 30 to about 2,000 cps.

3. The blend of claim 2, wherein the low viscosity hydroxypropyl methylcellulose has a viscosity from about 30 to about 1,000 cps.

4. The blend of claim 3, wherein the low viscosity hydroxypropyl methylcellulose has a viscosity from about 30 to about 500 cps.

5. The blend in claim 4, wherein the hydroxypropyl methylcellulose has a methoxyl substitution of about 25 to about 32 weight percent and a hydroxypropyl substitution of about 3 to about 13 weight percent.

6. The blend in claim 3, wherein the hydroxypropyl methylcellulose has a methoxyl substitution of about 27 to about 30 weight percent and a hydroxypropyl substitution of about 4 to about 7.5 weight percent.

7. The tape joint composition in claim 1, wherein each hydroxypropyl methylcellulose has a methoxyl substitution of about 25 to about 32 weight percent and a hydroxypropyl substitution of about 3 to about 13 weight percent.

8. The blend tape joint composition in claim 1, wherein the ratio of high viscosity to low viscosity hydroxypropyl methylcellulose is about 8:1 to about 1:2.

9. The blend in claim 8, wherein the ratio of high viscosity to low viscosity hydroxypropyl methylcellulose is from about 5:1 to about 2:1.

10. A stucco composition which contains the hydroxypropyl methylcellulose blend composition comprising a high viscosity hydroxypropyl methylcellulose having a viscosity from about 4,000 to about 120,000 cps and a low viscosity hydroxypropyl methylcellulose having a viscosity from about 5 to about 3,000 cps, and the hydroxypropyl methylcellulose blend is at least from about 10:1 to about 1:2 high viscosity hydroxypropyl methylcellulose to low viscosity hydroxypropyl methylcellulose.

11. A tile adhesive composition which contains the hydroxypropyl methylcellulose blend composition comprising a high viscosity hydroxypropyl methylcellulose having a viscosity from about 4,000 to about 120,000 cps and a low viscosity hydroxypropyl methylcellulose having a viscosity from about 5 to about 3,000 cps, and the hydroxypropyl methylcellulose blend is at least from about 10:1 to about 1:2 high viscosity hydroxypropyl methylcellulose to low viscosity hydroxypropyl methylcellulose.

12. A spray texture composition which contains the hydroxypropyl methylcellulose blend composition comprising a high viscosity hydroxypropyl methylcellulose having a viscosity from about 4,000 to about 120,000 cps and a low viscosity hydroxypropyl methylcellulose having a viscosity from about 5 to about 3,000 cps, and the hydroxypropyl methylcellulose blend is at least from about 10:1 to about 1:2 high viscosity hydroxypropyl methylcellulose to low viscosity hydroxypropyl methylcellulose.

* * * * *